(12) United States Patent
Metz et al.

(10) Patent No.: US 9,869,381 B2
(45) Date of Patent: Jan. 16, 2018

(54) TURBINE SHELL SPRING RETAINER

(71) Applicant: Schaeffler Technologies AG & Co. KG, Herzogenaurach (DE)

(72) Inventors: Sean Metz, Smithville, OH (US); Timothy Hess, Westlake, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 240 days.

(21) Appl. No.: 14/853,190

(22) Filed: Sep. 14, 2015

(65) Prior Publication Data
US 2017/0074379 A1   Mar. 16, 2017

(51) Int. Cl.
F16D 33/00 (2006.01)
F16H 45/02 (2006.01)
F16H 1/00 (2006.01)

(52) U.S. Cl.
CPC ............ *F16H 45/02* (2013.01); *F16H 1/00* (2013.01); *F16H 2045/0221* (2013.01)

(58) Field of Classification Search
CPC .................... F16H 45/02; F16H 2045/0221
USPC ........................................................... 60/338
See application file for complete search history.

(56) References Cited

U.S. PATENT DOCUMENTS

| 5,829,561 A | * | 11/1998 | Arhab | F16H 45/02 |
| | | | | 192/212 |
| 6,796,411 B2 | * | 9/2004 | Bauer | F16H 45/02 |
| | | | | 60/338 |

* cited by examiner

*Primary Examiner* — Michael Leslie
(74) *Attorney, Agent, or Firm* — Chester Paul Maliszewski

(57) ABSTRACT

A torque converter, including: a cover arranged to receive torque; an impeller including an impeller shell non-rotatably connected to the cover and at least one impeller blade connected to the impeller shell; a turbine including a turbine shell, at least one turbine blade connected to the turbine shell, and a heat treated portion; and a torsional vibration damper including: a cover plate arranged to receive torque from the cover or the turbine; and a spring. The spring is engaged with the cover plate and is arranged to contact the heat treated portion when the spring is compressed.

18 Claims, 6 Drawing Sheets

TURBINE SHELL SPRING RETAINER

TECHNICAL FIELD

The present disclosure relates generally to a turbine shell including a portion acting as a spring retainer for a torsional vibration damper, in particular a heat treated portion of the turbine shell

BACKGROUND

Retaining features are needed to hold springs in place for a torsional vibration damper in a torque converter, for example, wings formed about openings in a cover plate in which the springs are located. At the same time, it is desirable to reduce the axial extent of the torque converter. Since retaining features, such as the wings on a cover plate, require axial space, the wings interfere with the reduction of axial space in the torque converter.

SUMMARY

The present disclosure broadly describes a torque converter, including: a cover arranged to receive torque; an impeller including an impeller shell non-rotatably connected to the cover and at least one impeller blade connected to the impeller shell; a turbine including a turbine shell, at least one turbine blade connected to the turbine shell, and a heat treated portion; and a torsional vibration damper including: a cover plate arranged to receive torque from the cover or the turbine; and a spring. The spring is engaged with the cover plate and is arranged to contact the heat treated portion of the turbine shell when the spring is compressed.

The present disclosure broadly describes a torque converter, including: a cover arranged to receive torque; an impeller including an impeller shell non-rotatably connected to the cover and at least one impeller blade connected to the impeller shell; a turbine including a turbine shell including a heat treated portion and at least one turbine blade connected to the turbine shell; and a torsional vibration damper including: a cover plate arranged to receive torque from the cover or the turbine; and a spring. The spring is engaged with the cover plate and is in contact with the heat treated portion of the turbine shell when the first spring is not compressed.

The present disclosure broadly describes a torque converter, including: a cover arranged to receive torque; an impeller including an impeller shell non-rotatably connected to the cover and at least one impeller blade connected to the impeller shell; a turbine; and a torsional vibration damper including a cover plate arranged to receive torque from the cover or the turbine and a spring. The turbine includes: a first segment with a heat treated portion; a second segment formed separately from the first segment, fixedly connected to the heat treated portion and extending radially outward past the first segment; and at least one turbine blade connected to the turbine shell. The spring is engaged with the cover plate and includes an outer surface arranged to contact the heat treated portion of the turbine shell when the spring is compressed.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
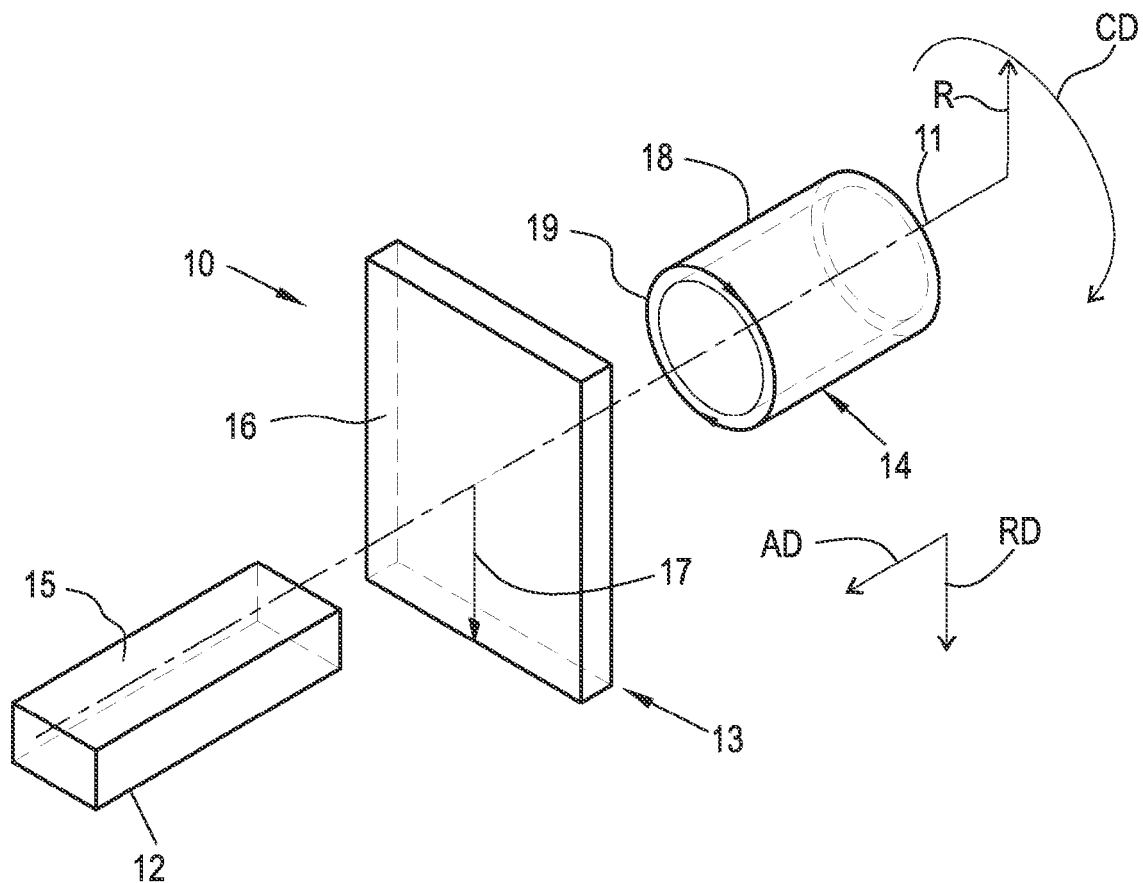
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
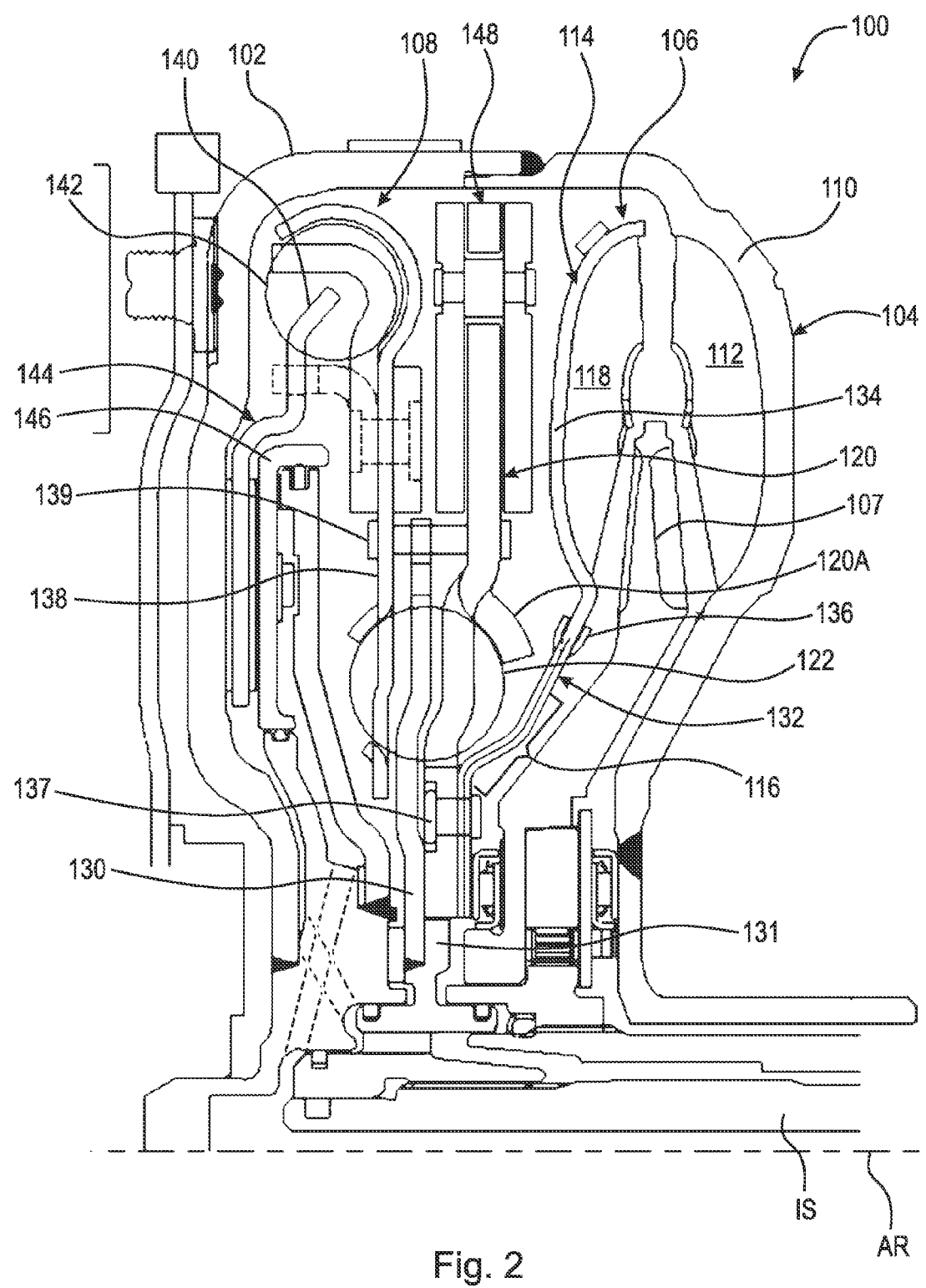
FIG. 2 is a partial cross-sectional view of a torque converter with a turbine shell having a heat treated portion.

FIG. 2 is a partial cross-sectional view of torque converter 100 with a turbine shell having a heat treated portion.

Figure 3:
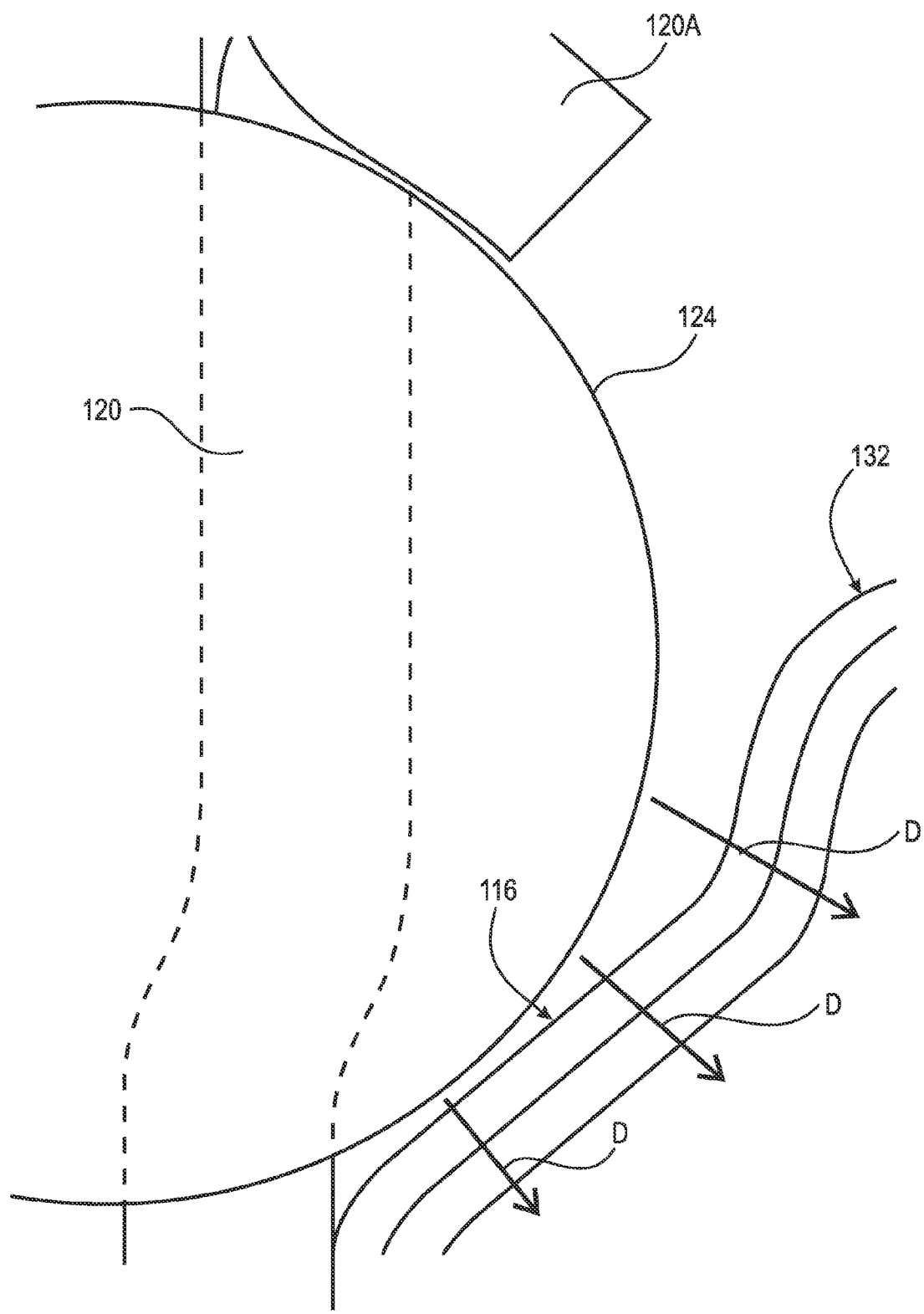
FIG. 3 is detail cross-section of FIG. 2 showing the heat treated portion.

FIG. 3 is detail cross-section of FIG. 2 showing the heat treated portion. The following should be viewed in light of FIGS. 2 and 3. Torque converter 100 includes axis of rotation AR, cover 102 arranged to receive torque, impeller 104, turbine 106, stator 107, and torsional vibration damper 108. Impeller 104 includes: impeller shell 110 non-rotatably connected to cover 102; and at least one impeller blade 112 connected to impeller shell 110. Turbine 106 includes: turbine shell 114 including heat treated portion 116; and at least one turbine blade 118 connected to turbine shell 114. The extent of portion 116 is approximately depicted in FIG. 2. The extent of portion 116 can vary from that shown in FIG. 2. Damper 108 includes: cover plate 120 arranged to receive torque from cover 102 or turbine 106; and spring 122.

In an example embodiment, spring 122 is arranged to contact heat treated portion 116 when spring 122 is compressed, for example by rotational torque applied to cover plate 120. That is, spring 122 is displaced in general direction D by the compression. In this embodiment, spring 122, for example surface 124, does not contact portion 116 when damper 108 is at rest and spring 122 is not being compressed. In an example embodiment, damper 108 includes output flange 130 arranged to non-rotatably connect to transmission input shaft IS, for example, via output hub 131. As is known in the art, cover plate 120 is arranged to transmit torque to flange 130 via spring 122. As the torque being transmitted increases or as the force resisting rotation of flange 130 increases, spring 120 compresses, bows in general direction D, and contacts portion 116, which, along with wing 120A of plate 120, retains spring 122 in plate 120. By "non-rotatably connected" components we mean: any time one of the components rotates, all of the components rotate; and relative rotation between the components is not possible.

FIG. 3 is detail cross-section of FIG. 2 showing heat treated portion 116. In an example embodiment, spring 122 and surface 124 are in contact with heat treated portion 116 when spring 122 is at rest and not compressed, for example, plate 120 is not transmitting torque to spring 122. When plate 120 transmits torque through spring 122, portion 116, along with wing 120A of plate 120, retains spring 122 in plate 120.

Figure 4:
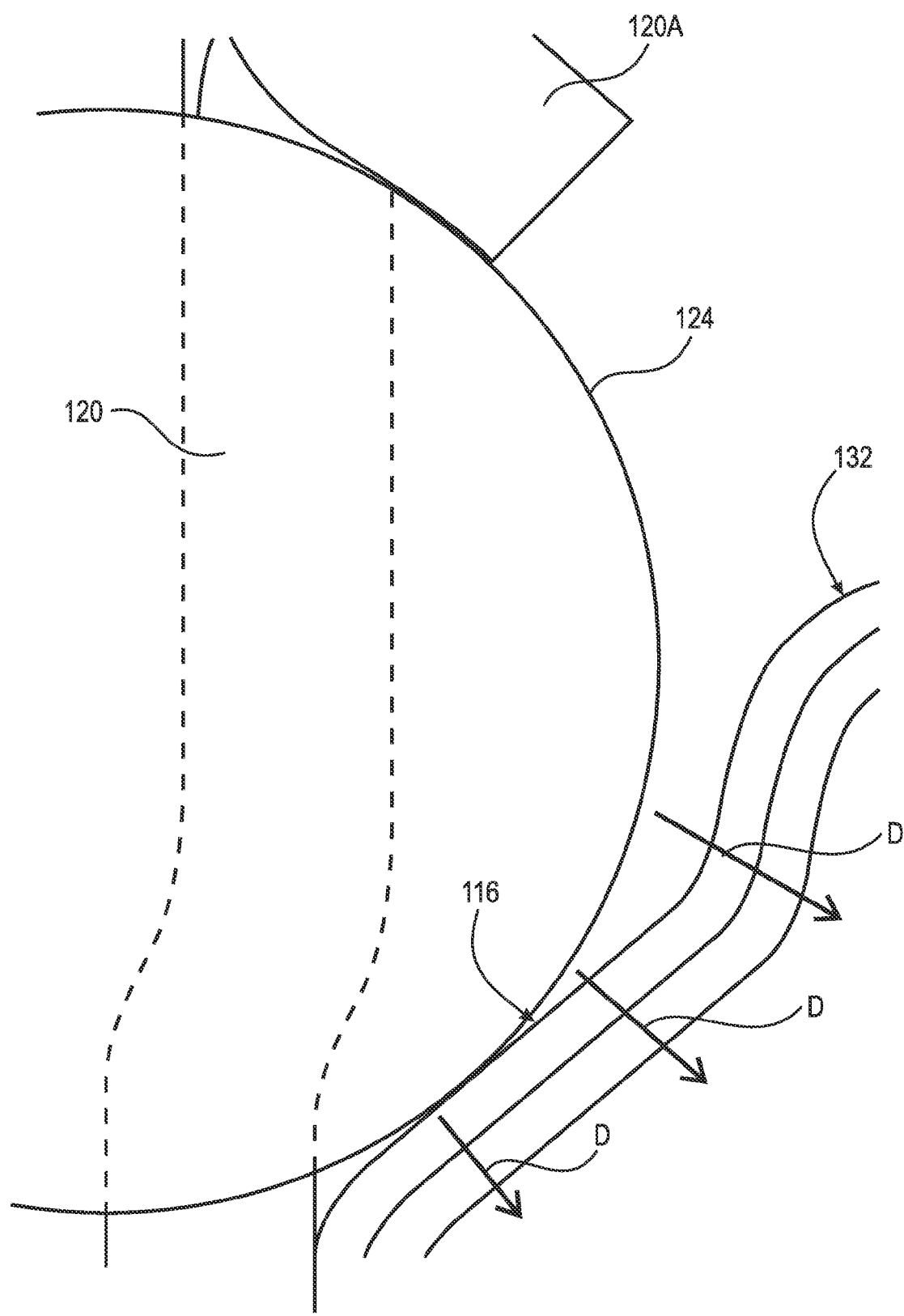
FIG. 4 is detail cross-section of FIG. 2 showing the heat treated portion.

The following is applicable to FIGS. 2 through 4. Turbine shell 114 includes segments 132 and 134. Segment 132 includes heat treated portion 116. Segment 134 is: separately formed from segment 132 (stated otherwise is a separate piece from segment 132); fixedly secured to segment 132, for example at joint 136; and located radially outward of segment 132. Segments 132 and 134 are joined at joint 136 by any means known in the art. In an example embodiment, cover plate 120 is non-rotatably connected to segment 132, for example by at least one fastener passing through segment 132, for example, at least one river 137. In an example embodiment, plate 120 is in contact with segment 132. In an example embodiment, heat treated portion 116 forms only part of segment 132. In an example embodiment, heat treated portion 116 includes the entirety of segment 132. In an example embodiment, turbine blade 118 is attached to segment 134 and not to segment 132. In an example embodiment, heat treated portion 116 is continuous in circumferential direction CD1. That is, portion 116 forms a continuous circumferential band around shell 114.

Figure 5:
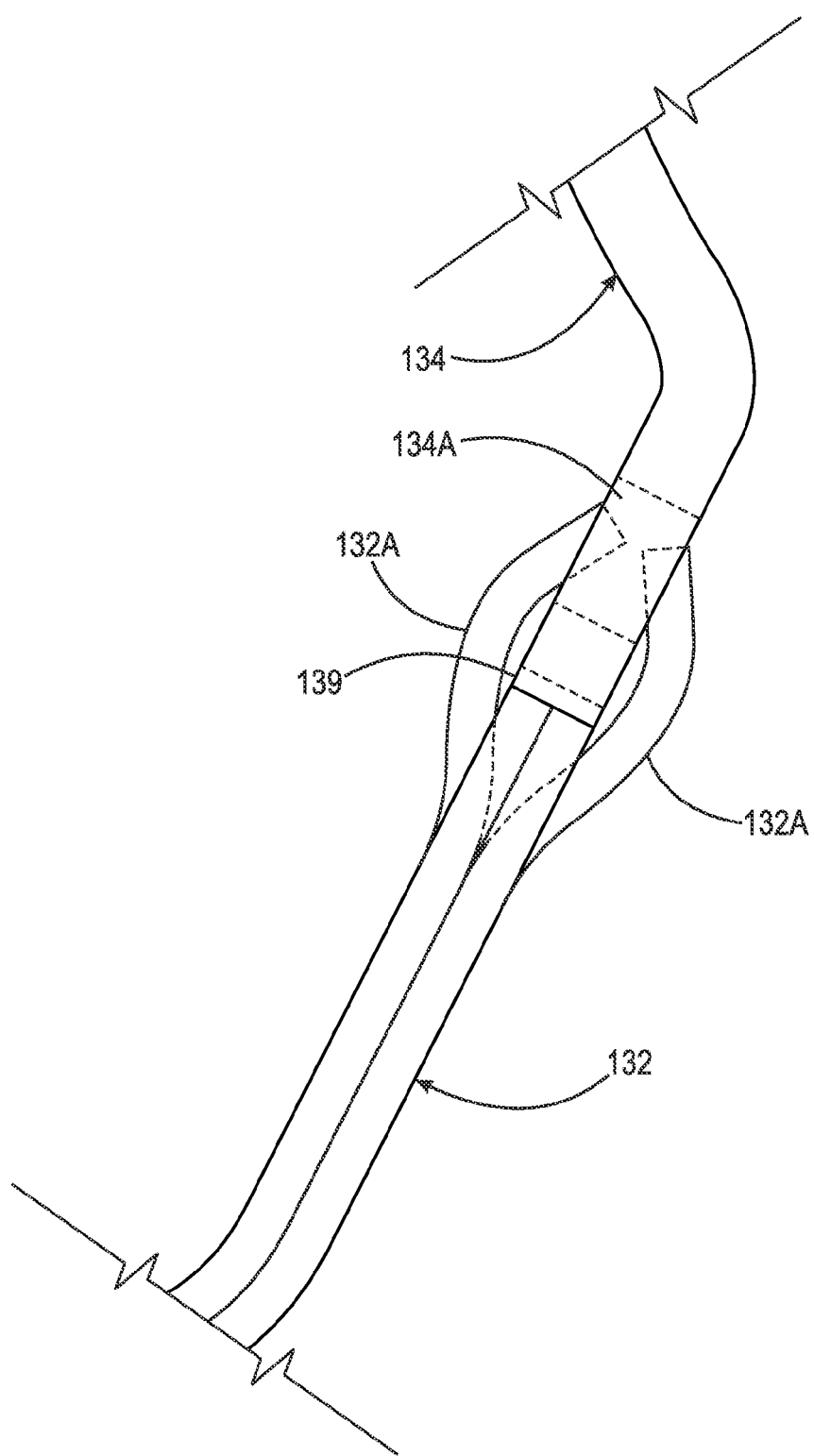
FIG. 5 is a detail of a turbine hub joint shown in FIG. 2.

FIG. 5 is a detail of turbine hub joint 136 shown in FIG. 2. In an example embodiment, joint 136 includes wing retention features 132A, formed by segment 132, that slip into slot 134A in segment 134 to hold segments 132 and 134 together. Spline connection 139, formed by interleaved splines in segments 132 and 134, provides a non-rotational connection of segments 132 and 134.

In an example embodiment, torsional vibration damper 108 includes cover plate 138: arranged to receive torque from cover 102 or turbine 106; non-rotatably connected to cover plate 120, for example by at least one rivet 139; and engaged with spring 122. In an example embodiment, torsional vibration damper 108 is a series damper and includes input element 140 and at least one resilient element 142 engaged with element 140 and cover plate 138. That is, torque from element 140 is transmitted to cover plate 138 by element(s) 142.

In an example embodiment, torque converter 100 includes torque converter clutch 144 including piston 146 arranged to frictionally engaged input component 140 with cover 102 to transmit torque from cover 102 to damper 108. In an example embodiment, torque converter 100 includes pendulum damper 148 connected to cover plate 120.

Figure 6:
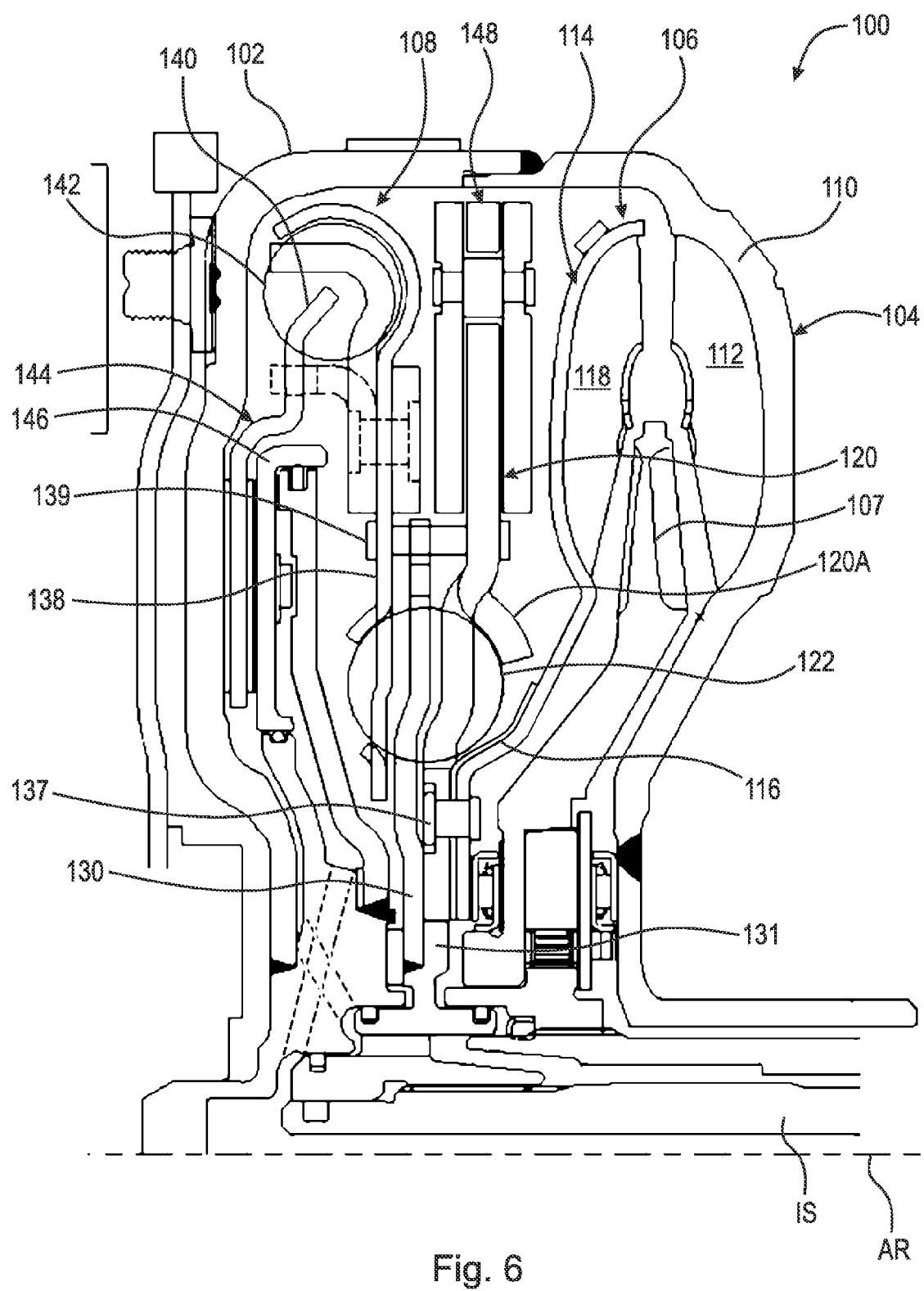
FIG. 6 is a partial cross-sectional view of a torque converter with a turbine shell having a heat treated portion.

FIG. 6 is a partial cross-sectional view of torque converter 100 with turbine shell 114 having a heat treated portion. In the example embodiment of FIG. 6, heat treated portion 116 is a separate piece of heat treated material non-rotatably connected to turbine shell 114. For example, turbine shell 114 is formed of one piece of material and portion 116 is formed of a different piece of material and fixed to shell 114 by any means known in the art, for example, by rivet 137. In an example embodiment, portion 116 is a heat treated spring steel plate having a thickness of about 0.5 mm.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
 a cover arranged to receive torque;
 an impeller including:
  an impeller shell non-rotatably connected to the cover; and,
  at least one impeller blade connected to the impeller shell;
 a turbine including:
  a turbine shell;
  at least one turbine blade connected to the turbine shell; and,
  a heat treated portion; and,
 a torsional vibration damper including:

a first cover plate arranged to receive torque from the cover or the turbine; and,
a spring:
engaged with the first cover plate; and,
arranged to contact the heat treated portion when the spring is compressed, wherein:
the turbine shell is formed of a first piece of material; and,
the heat treated portion is:
formed of a second piece of material, different from the first piece of material; and,
non-rotatably connected to the turbine shell.

2. The torque converter of claim 1, wherein the spring contacts the heat treated portion when the spring is at rest and not compressed.

3. The torque converter of claim 1, wherein the turbine shell includes:
a first segment including the heat treated portion; and,
a second segment:
separately formed from the first segment;
fixedly secured to the first segment; and,
located radially outward of the first segment.

4. The torque converter of claim 3, wherein the first cover plate is non-rotatably connected to the first segment by a fastener passing through the first segment.

5. The torque converter of claim 3, wherein the heat treated portion includes the entirety of the first segment.

6. The torque converter of claim 3, wherein the at least one turbine blade is attached to the second segment and not the first segment.

7. The torque converter of claim 1, wherein the heat treated portion is continuous in a circumferential direction.

8. The torque converter of claim 1, wherein the torsional vibration damper includes an output flange, the output flange:
engaged with the spring; and,
arranged to non-rotatably connect to an input shaft for a transmission.

9. The torque converter of claim 1, wherein the torsional vibration damper includes a second cover plate, the second cover plate:
arranged to receive torque from the cover;
non-rotatably connected to the first cover plate; and,
engaged with the spring.

10. A torque converter, comprising:
a cover arranged to receive torque;
an impeller including:
an impeller shell non-rotatably connected to the cover; and,
at least one impeller blade connected to the impeller shell;
a turbine including:
a turbine shell including a heat treated portion; and,
at least one turbine blade connected to the turbine shell; and,
a torsional vibration damper including:
a first cover plate arranged to receive torque from the cover or the turbine; and,
a spring:
engaged with the first cover plate; and,
contacting the heat treated portion of the turbine shell when the spring is not compressed, wherein the turbine shell includes:
a first segment including the heat treated portion; and,
a second segment:
separately formed from the first segment;
fixedly secured to the first segment and,
located radially outward of the first segment.

11. The torque converter of claim 10, wherein the first cover plate is non-rotatably connected to the first segment.

12. The torque converter of claim 10, wherein the heat treated portion includes the entirety of the first segment.

13. The torque converter of claim 10, wherein the at least one turbine blade is attached to the second segment and not the first segment.

14. The torque converter of claim 10, wherein the torsional vibration damper includes an output flange, the output flange:
engaged with the spring; and,
arranged to non-rotatably connect to an input shaft for a transmission.

15. A torque converter, comprising:
a cover arranged to receive torque;
an impeller including:
an impeller shell non-rotatably connected to the cover; and,
at least one impeller blade connected to the impeller shell;
a turbine including:
a turbine shell including:
a first segment with a heat treated portion; and,
a second segment:
formed separately from the first segment;
fixedly connected to the heat treated portion; and,
extending radially outward past the first segment; and,
at least one turbine blade connected to the turbine shell; and,
a torsional vibration damper including:
a first cover plate arranged to receive torque from the cover or the turbine; and,
a spring:
engaged with the first cover plate; and,
including an outer surface arranged to contact the heat treated portion of the turbine shell when the spring is compressed.

16. The torque converter of claim 15, wherein:
the first cover plate is non-rotatably connected to the first segment; or,
the heat treated portion includes the entirety of the first segment; or,
the at least one turbine blade is attached to the second segment and not the first segment.

17. The torque converter of claim 15, wherein the first cover plate is non-rotatably connected to and in contact with the first segment.

18. The torque converter of claim 15, wherein the torsional vibration damper includes:
an output flange:
engaged with the spring; and,
arranged to non-rotatably connect to an input shaft for a transmission; and,
a second cover plate:
arranged to receive torque from the cover;
non-rotatably connected to the first cover plate; and,
engaged with the spring.

* * * * *